United States Patent [19]

Meyer

[11] Patent Number: 5,534,859
[45] Date of Patent: Jul. 9, 1996

[54] INSTRUMENT FOR MEASURING LENGTHS OR ANGLES

[76] Inventor: Hans U. Meyer, Rue de Lausanne 42, 1110 Morges, Switzerland

[21] Appl. No.: 309,493

[22] Filed: Sep. 23, 1994

[30] Foreign Application Priority Data

Oct. 19, 1993 [CH] Switzerland ............... 3150/93

[51] Int. Cl.⁶ .................................................. G08C 19/10
[52] U.S. Cl. ...................... 340/870.37; 324/660; 324/662
[58] Field of Search .................................. 324/690, 662, 324/660, 661, 686; 340/870.37

[56] References Cited

U.S. PATENT DOCUMENTS

| Re. 34,741 | 9/1994 | Andermo | 324/690 |
|---|---|---|---|
| 1,674,729 | 6/1928 | Ledwinka | 296/202 |
| 2,674,729 | 4/1954 | Carter | 324/660 |
| 3,342,935 | 9/1967 | Leifer et al. | 178/19 |
| 3,857,092 | 12/1974 | Meyer | 324/61 R |
| 4,477,810 | 10/1984 | Tanaka et al. | 340/870.37 |
| 4,543,526 | 9/1985 | Burckhardt et al. | 324/660 |
| 4,733,235 | 3/1988 | Baer et al. | 324/660 |
| 4,810,951 | 3/1989 | Meyer | 324/660 |
| 4,841,225 | 6/1989 | Meyer | 324/660 |
| 4,878,013 | 10/1989 | Andermo | 340/870.37 |
| 4,879,508 | 11/1989 | Andermo | 340/870.37 |
| 4,879,552 | 11/1989 | Arai et al. | 340/870.37 |
| 4,882,539 | 11/1989 | Meyer | 340/870.37 |
| 4,893,071 | 1/1990 | Miller | 340/870.37 |
| 4,959,615 | 9/1990 | Andermo | 340/870.37 |
| 5,049,824 | 9/1991 | Suzuki et al. | 324/660 |
| 5,053,715 | 10/1991 | Andermo | 324/662 |
| 5,068,653 | 11/1991 | Klinger et al. | 340/870.37 |
| 5,172,039 | 12/1992 | Owens | 340/870.37 |
| 5,237,284 | 8/1993 | Van Der Valk | 324/660 |
| 5,239,307 | 8/1993 | Andermo | 340/870.37 |
| 5,293,131 | 3/1994 | Semones et al. | 340/870.37 |
| 5,304,937 | 4/1994 | Meyer | 324/662 |
| 5,394,096 | 2/1995 | Meyer | 324/662 |
| 5,451,940 | 9/1995 | Schneider et al. | 324/661 |
| 5,461,320 | 10/1995 | Strack et al. | 340/870.37 |

FOREIGN PATENT DOCUMENTS

| 0184584 | 6/1986 | European Pat. Off. . |
|---|---|---|
| 0270440 | 6/1988 | European Pat. Off. . |
| 0271436 | 6/1988 | European Pat. Off. . |
| 0400626 | 12/1990 | European Pat. Off. . |
| 0435429 | 7/1991 | European Pat. Off. . |
| 0537800 | 4/1993 | European Pat. Off. . |
| 2668822 | 5/1992 | France . |
| 4009977 | 10/1990 | Germany . |
| 4017954 | 8/1991 | Germany . |
| 2009944 | 3/1982 | United Kingdom . |

Primary Examiner—Brent A. Swarthout
Assistant Examiner—Timothy Edwards, Jr.
Attorney, Agent, or Firm—Young & Thompson

[57] ABSTRACT

The capacitance sensor (1) comprises a linear or curvilinear array of electrodes (10) connected to means generating on these electrodes (10) a spatially periodic electric potential pattern shifting by increments along said array. Electrodes (10) are disconnected in turn to act as momentarily receiving electrodes (10R), also according to a spatially periodic pattern, shifting by the same increments. Both patterns shift alternately, i.e. the shifts of one pattern taking place between the shifts of the other. A linear or curvilinear scale (2), with a periodic pattern of electrodes (20) or dielectric or conducting relief, facing the sensor, will thus create a periodic fluctuation of the signal coupled on the momentarily receiving electrodes. The relative position between scale (2) and sensor (1) may then be accurately determined by evaluating the phase, after demodulation, of said signal. As the sensor may be integrated on a semiconductor die and the scale may be very narrow, extreme miniaturization and low cost is given. (FIGS. 1a and 1b)

16 Claims, 4 Drawing Sheets

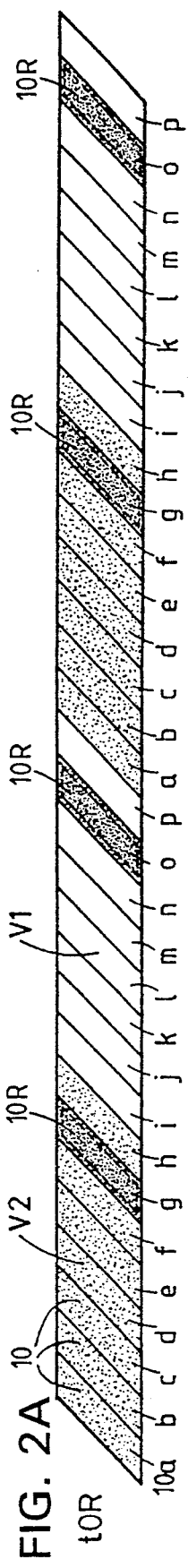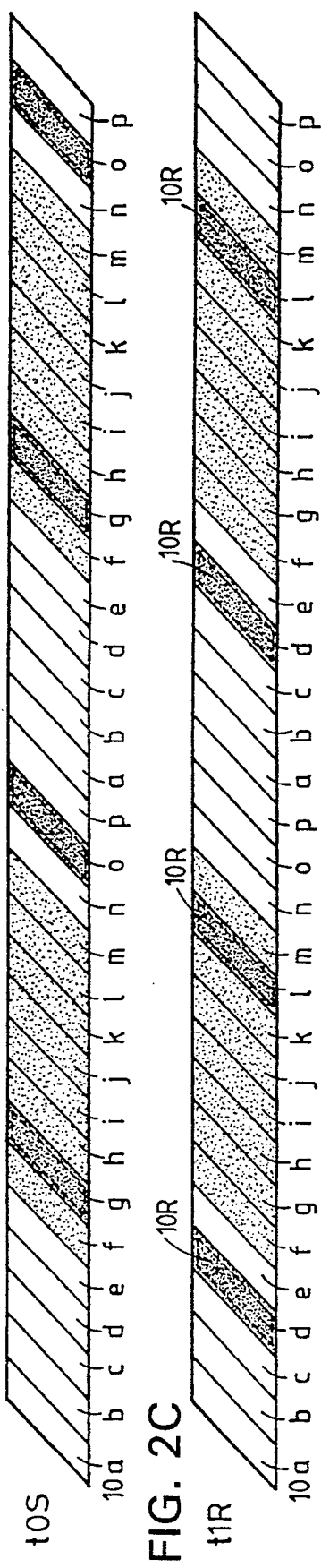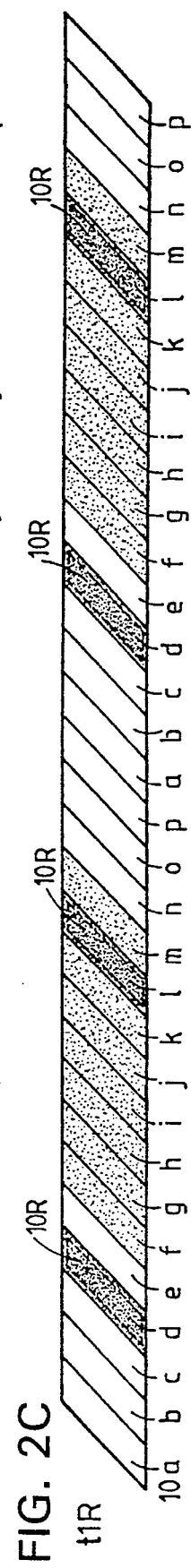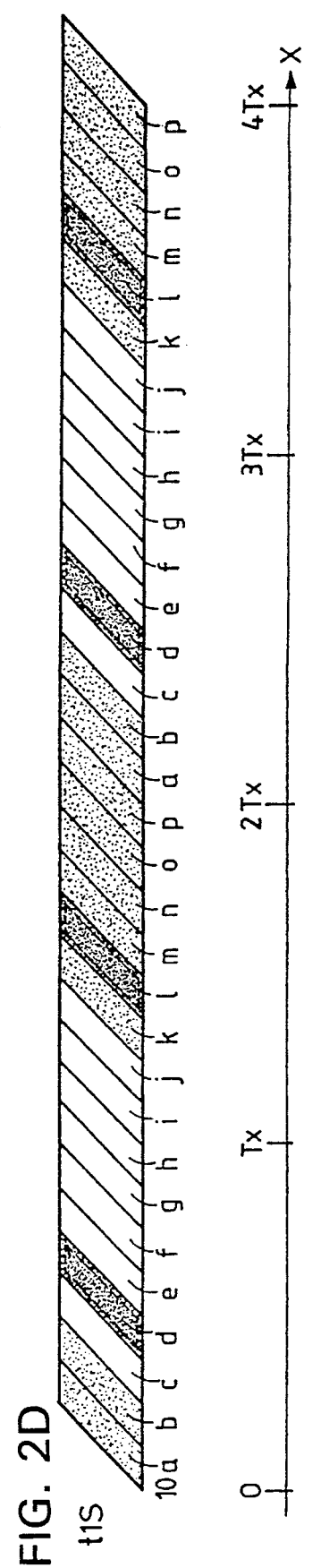

5,534,859

INSTRUMENT FOR MEASURING LENGTHS OR ANGLES

BACKGROUND OF THE INVENTION

FIELD OF THE INVENTION

The invention relates to a linear or angular measuring instrument comprising a capacitive sensor having transmitting electrodes for transmitting capacitively coupled signals and arranged along a first linear or curvilinear array, said transmitting electrodes being connected to first means generating on said electrodes a first spatially periodic pattern of electrical signals shifting by increments along said first array, said sensor having receiving electrodes, for receiving capacitively coupled signals, connected to second means for determining the relative position along said first array of an organ having a second spatially periodic array of features which may influence the capacitive couplings of transmitted and received signals.

DISCUSSION OF RELATED ART

Several embodiments of such instruments are known. A rotary capacitive encoder having curvilinear arrays of interlaced electrodes, i.e. with odd electrodes connected together and even electrodes connected together, is described in U.S. Pat. No. 1,674,729. Such arrays have two electrodes per signal period T, i.e. the electric signals on odd and even electrodes are of opposite phase. For interpolating with a higher accuracy within the spatial period Tx it would be of advantage to have a number N of electrodes per spatial period Tx significantly larger than two: if, for example, position is determined by measuring the phase, after demodulation if necessary, of the signal coupled to the receiving electrodes, there will be a frequency ratio of N between the harmonic waveform due to the electrode pitch of Tx/N, and the fundamental waveform related to the spatial period Tx; the higher this ratio, the easier to reject the unwanted harmonic by filtering.

In U.S. Pat. No. 3,342,935 the fine position of a stylus across a board is measured by having the stylus pick up signals from a matrix made of two orthogonal arrays of wire electrodes, one array for each axis, the wire electrodes of each array being connected to four sine waves in quadrature, their phase over adjacent wires being e.g. 0, 90, 180, 270, 0, 90, etc. degrees: there are 4 wire electrodes per spatial period Tx. In all these embodiments electrodes must be connected both on the sensor and the scale, making connections between sensor and scale necessary.

Patent DE 2.218.824 allows capacitive coupling back to the sensor of the signals picked up by the scale. Patent GB 2.009.944, which proposes a phase measurement method, also provides for such coupling from the scale back to the sensor. In both cases the necessity of connections between sensor and scale is eliminated, but at the expense of having a wider scale and sensor. This is due to the sensor needing at least one pickup electrode alongside the transmitting electrode array to get capacitive coupling to the receiving electrodes on the scaled moreover, a guard electrode needs to screen the pickup electrode from direct couplings from the transmitting electrode array on the sensor. As a result, the width across the sensor, and scale, becomes prohibitive for many applications, either by lack of space, e.g. in miniature cylindrical gauging probes or for economical reasons, e.g. if the sensor is integrated on a silicon die, where cost increases strongly with size. Also, as scale electrodes must have two separate areas, one to receive signals from the transmitting electrode array, the other to couple the received signal back to the pickup electrode, both areas being connected, this puts enough restraints on the shape and location of scale electrodes to make some applications, in particular a two dimensional scale, next to impossible.

SUMMARY OF THE INVENTION

An object of the invention is to remedy to these disadvantages and to this end, the invention is characterized in that said sensor comprises third means for disconnecting transmitting electrodes momentarily and in turn from said first means and connecting them to said second means so they become momentarily receiving, said third means providing a second spatially periodic pattern of momentarily receiving electrodes, said first and second pattern shifting alternately by increments so that the shift of one pattern takes place during the interval between the shifts of the other pattern, said organ creating a periodic fluctuation of the signals received by the momentarily receiving electrodes.

The invention makes a simple, low-cost instrument possible, even if its sensor is entirely integrated on a silicon die, as the narrow electrode array only needs a small area. Furthermore, as local variations in gap between sensor and scale usually are the main source of inaccuracy, the smaller size of the electrode array, by reducing these variations, already improves accuracy.

A sensor according to the invention may be configured to work with several types of organs or scales with electrodes, surface relief or other spatially periodic parameters influencing coupling capacitances. Scales may have very simple geometry: e.g. electrodes may be of rectangular shape and no need to be separated by guard electrodes. They can be wider, narrower or of same width than the sensor electrodes. This, for example, allows a straightforward extension to a scale allowing two coordinate measuring by two sensors according to the invention, said scale having a two dimensional electrode array.

Advantageously, for the sake of simplicity and measuring accuracy, said second means allow to find the relative position of said organ to the sensor by evaluating the phase, after demodulation, of the signal received by the momentarily receiving electrodes.

In a preferred embodiment, said first means provide a first spatially periodic pattern with a period 2Tx made of first groups of N electrodes connected to a first potential alternating with second groups of N electrodes connected to a second potential, N being an integer higher than 3, said third means providing a second spatially periodic pattern with a period Tx consisting of at least one electrode disconnected from each group of N electrodes to become momentarily receiving, the selected momentarily receiving electrodes being amidst at least two electrodes of same potential.

This embodiment attains good measuring accuracy with relatively simple electronics. As the spatial period of the pattern is double that of the scale, the influence due to voltage differences between scale and sensor affecting all scale electrodes is eliminated, and larger gaps between sensor and scale become feasible as, due to the longer pattern period, the useful signal strength decreases less as the gap increases.

Direct couplings from electrodes contiguous to the momentarily receiving electrodes do not affect measurement, as their potential remains unchanged during said first pattern shifts.

Advantageously said first and second pattern have shifting increments of M electrodes, M being an integer close to N/2.

Such a shift is equivalent to one with a much smaller increment of M–N/2 electrodes but with the signal polarity of said first pattern changing with each shift. Signal strength is high, due to the large number of electrodes changing potential at every shift. Additionally, by demodulating the signal from the momentarily receiving electrodes, i.e. by reversing its polarity every second shift, the resulting signal will be similar to an undemodulated signal generated by said much smaller increment, but undesirable low frequency signals created by moving static charges, piezoelectric behavior, etc. will be rejected by said demodulation to a higher frequency where they may easily be filtered.

In a preferred embodiment, the patterns formed by first and second groups of N electrodes before and after a shifting increment are symmetrical around the middle of any momentarily receiving electrode, if isolated, or else around the middle of any group of contiguous momentarily receiving electrodes.

The signal coupled on the momentarily receiving electrodes, given the absence of a scale or if its electrodes also form a symmetrical pattern as seen from the middle of momentarily receiving electrodes or of groups of them, is thus nil, as couplings from all electrodes cancel out. This greatly facilitates measuring. The possibility is also given to test the sensor for malfunctions or erroneous couplings, as in such a case the received signal will not even nearly cancel in the absence of a scale (or in the presence of a dummy scale without electrodes and relief).

In a preferred embodiment, the instrument comprises a signal generator connected to 2N first lines (Pa–Pp), generating on one line (Pa) a periodic signal output derived from a clock input, and shifting said signal by 1 to 2N-1 clock periods to generate the additional 2N-1 signals for the 2N-1 remaining lines (Pb–Pp), each electrode being switchable to one of these lines.

Advantageously, said signal generator is also connected to N second lines (Rai–Rhp) so as to provide said second pattern, the signals generated on said N second lines (Rai–Rhp) controlling electronic supply switches (S1) connecting or disconnecting each electrode with one of said first 2N lines (Pa–Pp), and electronic pickup switches (S2,S3) disconnecting, respectively connecting said electrode to an input of a differential amplifier. Such a scheme is safe and the necessary logic is simple.

In a preferred embodiment, each electrode is connected to a first pickup switch (S2) followed by a second pickup switch (S3), the common part between said switches being connected to a constant potential when said switches are open. This prevents any undesirable couplings from the electrodes to the differential amplifier.

In a similar embodiment, the pickup switches (S2,S3) are connected to one of two third lines (I1,I2) which are connected by commutators (S5,S6) to amplifiers followed by sample-and-holds followed by a differential-to-single-ended converter, a filter and a comparator.

The electronics of this embodiment are simple to implement and do not normally impair sensor accuracy.

Other advantages are set forth in the claims and in the following text, describing the invention in more detail with reference to the accompanying drawings showing, by way of example only, an embodiment of the invention.

BRIEF DESCRIPTION OF THE DRAWINGS

FIG. 2 shows by way of example four successive states of potential and momentarily receiving electrode patterns of a sensor according to the invention.

DETAILED DESCRIPTION OF PREFERRED EMBODIMENT

Figure 1A:
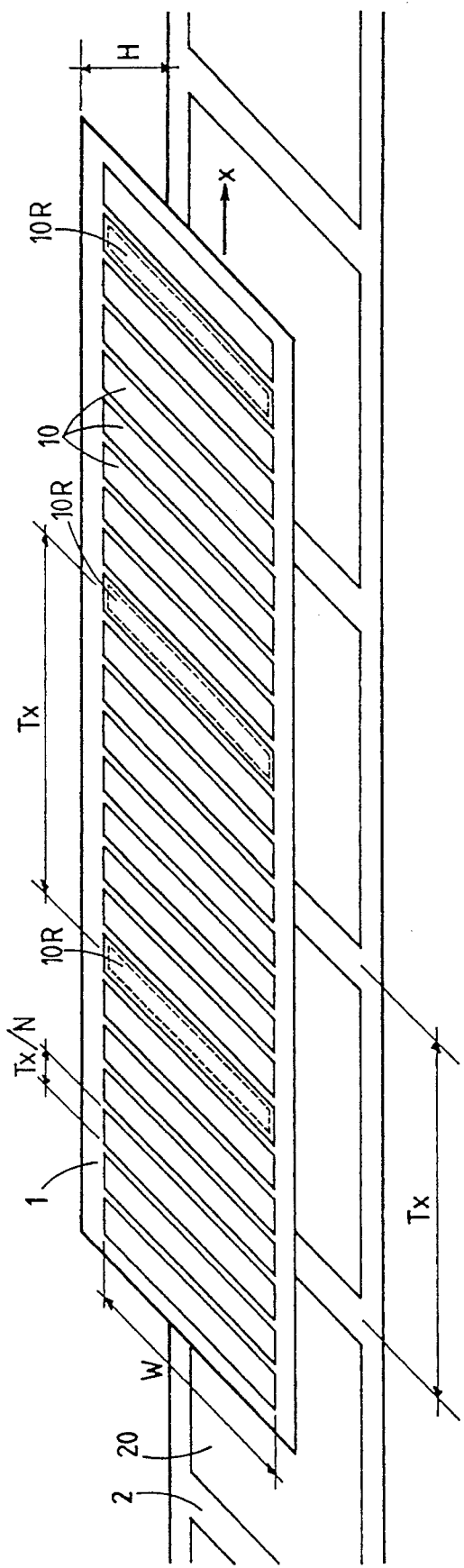
FIGS. 1A and 1B respectively show linear (FIG. 1A) and curvilinear (FIG. 1B) arrays of sensor and scale electrodes according to the invention.

An instrument according to the invention, incorporating a sensor 1 provided with an electrode array 10 and a scale 2 formed by an electrode array 20 is shown in FIG. 1A. The sensor 1 and scale 2 face each other, separated by a given gap H. The sensor 1 may be displaced relatively to the scale 2 along the x coordinate, which is to be measured. Tx is the pitch of the scale electrodes 20 along x is and Tx/N the one of the sensor electrodes, N being the number of electrodes 10 over Tx; in FIG. 1, N=8. A part of the sensor electrodes 10 functions momentarily as receiving electrodes 10R, being influenced by the field generated of the rest of the electrodes as a function of their position relative to the electrodes 20 of the scale 2. As the pattern of receiving electrodes is constantly shifting, all electrodes 10 become in turn receiving electrodes 10R. Thus, all electrodes 10 have the same functions. An advantage of this simple configuration is that the width W across x of the sensor may be as large as the scale electrode array, a feature of interest especially when both scale and sensor must be narrow (W<<T) and when the scale to sensor gap H is relatively important: the coupling capacitances between scale and sensor electrodes then decrease very strongly with increasing width W for a given gap H. The decrease in coupling capacitances, which for a ratio W/H>> 1 is about proportional to W, becomes more marked and tends to decrease like the square of the ratio H/W as the width W becomes inferior to the gap H, assuming that both scale and sensor electrode arrays have about the same width.

Figure 1B:
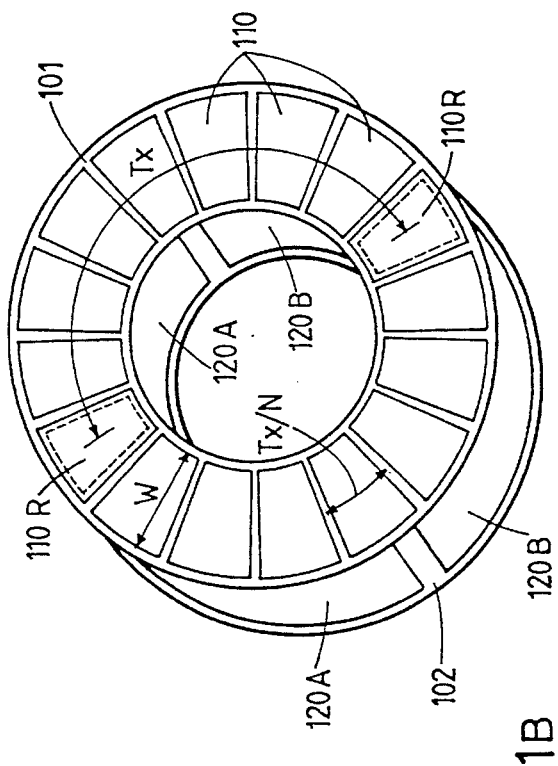

Such size constraints, i.e. a width W much smaller than the pitch Tx and a gap H in the same order of magnitude as said width W, are often found in rotary encoders which must be absolute over one turn or a fraction of it, and where there is only a small difference between outer radius and inner radius, e.g. if said encoder is built around a shaft, and where, for constructive reasons, the gap H cannot be made arbitrarily small. The electrode arrays shown in FIG. 1B are optimally suited to such conditions. The sensor 101 has an annular array of 16 electrodes 110 facing an annular scale 102 with two electrodes 120A, 120B; the circular period Tx thus amounts to one half turn. The pattern of momentarily receiving electrodes 10R, constituted of two electrodes 180 degrees apart, constantly shifts around the circumference. This way there is no need for an annular receiving electrode around the sensor electrode array and for a guard electrode between them, which would drastically reduce the useful signal due to the decrease in coupling capacitance accompanying the narrower possible width W of said sensor electrode array. The electrode arrangement made possible by the features of the invention suits this particular case well.

Other advantages are set forth by a more detailed description of the operation of a sensor 1 according to the invention, first by analyzing the effect of incrementally shifting a potential pattern along the array of electrodes 10 on the momentarily receiving electrodes. To this end, FIG. 2 shows by way of example four successive states of potential patterns and of momentarily receiving electrode patterns on a set of 32 electrodes of a sensor according to the invention. For the sake of clarity, it is admitted that these 32 electrodes lie in the middle of a longer linear array; means for eliminating perturbations due to the finite length of the array will be proposed further below.

The potential pattern shown in FIG. 2 consists of two potentials: V1 (white), V2 (shaded). With the exception of momentarily receiving electrodes 10R, all electrodes 10 of the array are either at V1 or at V2. Said pattern repeats itself every 16 electrodes, although the scale period Tx as shown in FIG. 1 corresponds to 8 electrodes (N=8): the potential pattern has thus a period of 2Tx. This is also the case for the pattern of momentarily receiving electrodes 10R, even though they are apparently spaced 8 electrodes apart: in fact, said pattern consists of momentarily receiving electrodes which are alternately connected to one or the other of two amplifier inputs (not shown in FIG. 2), hence a period of 2Tx for both pattern. At any given moment, every 16th electrode 10 will have the same potential and same function, i.e. either at potential V1, or V2, or connected as a momentarily receiving electrode to one amplifier input, or the other. Thus the electrodes in FIG. 2 are indexed by 16 letters a to p which characterize their relative position within the interval of 2Tx, each letter appearing twice in the 32 electrodes shown in FIG. 2. Electrodes indexed by the same letter are thus at the same potential and have the same function. The pattern shown in FIG. 2 are, at time t0R, as follows: electrodes 10a–10h, except momentarily receiving electrode 10g, are at V2, electrodes 10i–10p, except 10o, momentarily receiving, are at V1. Next, at time t0S, the potential pattern has shifted by an increment of 5 electrodes, i.e. by 5Tx/8 to the right; electrodes 10f, 10h–10m are at V2, and electrodes 10n, 10p, 10a–10e are at V1; momentarily receiving electrodes 10g, 10o have not moved, as they received the signal coupled by the potential change from V2 to V1 of the 5 electrodes 10a–10e and from V1 to V2 of the 5 electrodes 10i–10m; meanwhile, electrodes 10f and 10h, contiguous to momentarily receiving electrode 10g, as well as 10n and 10p, contiguous to 10o, remained at the same potential. Influenced by features of period Tx of the scale, such as electrodes not shown in FIG. 2, the above-mentioned changes in potential will induce a change of potential on said momentarily receiving electrodes 10g and 10o. This change in potential is a function of the relative position of the scale electrodes to the sensor electrodes. If the scale electrodes are exactly facing the momentarily receiving electrodes 10g and 10o, couplings, influenced by said scale electrodes, from each set of 5 electrodes 10a–10e and 10i–10m will be equal for symmetry reasons, so that the net induced potential change on electrodes 10g and 10o will be nil as the changes in potential of both sets of 5 electrodes are of opposite polarity. If, on the other hand, the scale electrodes were slightly moved to the right, coupling from the set of 5 electrodes 10a–10e to the momentarily receiving electrodes 10g would increase, while it would increase from the other set of 5 electrodes 10i–10m to the other momentarily receiving electrodes 10o. Assuming potential V1 to be higher than V2, an increase in potential would result on momentarily receiving electrodes 10g and a decrease on momentarily receiving electrodes 10o. If, instead, the scale electrodes were moved slightly to the left, there would obviously be a decrease in potential on electrodes 10g and an increase on electrodes 10o. If the scale electrodes, instead of exactly facing the momentarily receiving electrodes 10g and 10o, were equidistant from them, i.e. displaced by Tx/2, the net induced potential change on electrodes 10g and 10o would again be nil.

Figure 3:
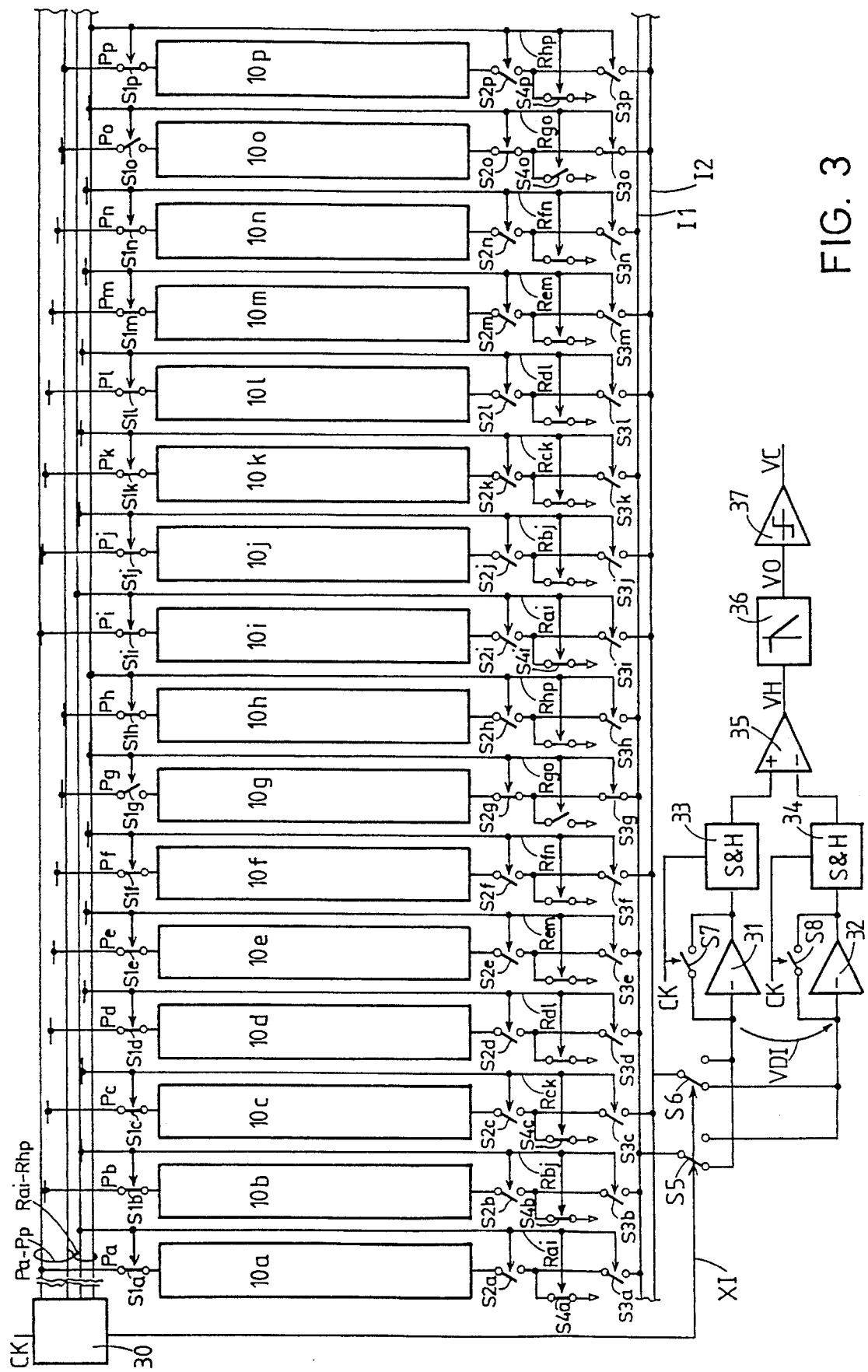
FIG. 3 is a schematic view of the essential part of the electronic circuitry of a sensor according to the invention.

One sees that the changes in potential on momentarily receiving electrodes 10R one period Tx apart are of equal amplitude but of opposite polarity and are a periodic function, of period Tx, of the displacement between said momentarily receiving electrodes and the scale electrodes. So, by connecting one half of the momentarily receiving electrodes to one input of a differential amplifier and the other half to the other input, the useful signal is doubled while overall changes in potential between sensor and scale, due to influences external to the electrodes of sensor and scale, cancel, as they show up with equal amplitude and polarity on both inputs of said differential amplifier (FIG. 3).

Next, at time t1R, the momentarily receiving electrode pattern shifts by an increment of 5 electrodes, i.e. of 5Tx/8, to the right. The momentarily receiving electrodes 10R are now electrodes 10l and 10d, while electrodes 10g and 10o are connected to V1 and V2 again. The potential pattern on the other electrodes remains unchanged, and will only be shifted by an increment of 5 electrodes (5Tx/8) to the right at time t1S, while momentarily receiving electrodes 10l and 10d will pick up the signals due to the transitions from V2 to V1 on the sets of 5 electrodes 10f–10j and from V1 to V2 on the sets of 5 electrodes 10n, 10o, 10p, 10a, 10b. Here again, electrodes next to the momentarily receiving electrodes 10l and 10d, i.e. 10k, 10m, 10c, 10e will remain at the same potential.

The pattern of potentials and of momentarily receiving electrodes, given as an example of a sensor according to the invention in FIG. 2, depicts the features of such pattern which are necessary to get a good sensor performance. One particular feature is the symmetry between potential patterns before and after a shift around the middle of each electrode, or set of contiguous electrodes, being momentarily receiving during that shift: e.g. considering these pattern at times t0R and t0S, one sees that one momentarily receiving electrodes 10g has one electrode 10h to its right and six electrodes 10a–10f to its left at a potential V2 at time t0R, whereas it has one electrode 10f to its left and six electrodes 10h–10m to its right at the same potential V2 at time t0S. Another feature is that the electrodes contiguous to the momentarily receiving electrodes, 10f and 10h in this example, stay at the same potential.

Assuming a number of N electrodes per pitch Tx, N–M contiguous electrodes remain at the same potential when the potential pattern shifts by increments of M electrodes. For reasons of symmetry mentioned above, sets of R contiguous momentarily receiving electrodes must be in the middle of said N–M electrodes. Obviously then if N–M is even R must be even and if N–M is odd R must be odd; in particular there may only be one momentarily receiving electrode (R=1) if N–M is odd.

By numbering the N electrodes within a pitch Tx from left to right in FIG. 2 with a numerator from 1 to N, the numerator of the first momentarily receiving electrode would amount to:

$$J=(N+M-R)/2+1$$

and in the case of a single momentarily receiving electrode (R=1):

$$J=(N+M+1)/2$$

For a pitch Tx amounting to 8 electrodes and an increment of 5 electrodes, the numerator J of the first momentarily receiving electrode would then be 7, effectively corresponding to the electrode 10g in FIG. 2. Another favorable pattern is given by a pitch Tx of 16 electrodes and an increment of 9 electrodes, the numerator J of the momentarily receiving electrode being then 13.

The use of potential patterns and momentarily receiving electrode patterns having said property of symmetry between potential patterns, before and after a shift, around the momentarily receiving electrodes 10R, makes sure the net potential change coupled on said electrodes 10R in the absence of a scale, or when the scale electrodes also form a symmetrical pattern around said electrodes 10R, is nil. The fact that electrodes contiguous to momentarily receiving electrodes remain at the same potential during potential pattern shifts ensures the absence of couplings between them: this is very important because the narrow spacing between contiguous electrodes implies strong mutual capacitances with large variations even for small changes of said spacing.

Other properties of patterns shown in FIG. 2 are also of interest. As these pattern have a pitch double that of the scale (Tx), the influence of changes in potential between scale and sensor affecting all scale electrodes equally (common mode voltages) may be reduced or even suppressed, as seen above. Another advantage of such a double pattern pitch comes from the slower decrease of the changes in potential coupled on momentarily receiving electrodes with increasing scale to sensor gap H. The choice of a shifting increment near Tx/2 (here 5Tx/8) is also advantageous in that it allows a simple demodulation of the signal on the momentarily receiving electrodes, which demodulation provides the added advantage of rejecting low frequency noise signals generated by static charges during relative movements of scale and sensor or by piezoelectric effects during shocks and vibrations. Assuming a shifting increment of 5Tx/8, which together with 3Tx/8 is nearest to T/2 without being equal, and starting from zero, the following sequence of relative positions between momentarily receiving electrodes and scale can be found, expressed in fractions of Tx (i.e. as if Tx were equal to one):

0, 5/8, 10/8, 15/8, 20/8, 25/8, 30/8, 35/8, 40/8, etc.

As couplings between scale and momentarily receiving electrodes are spatially periodic, of period Tx, the equivalent relative position sequence within one pitch is:

0, 5/8, 2/8, 7/8, 4/8, 1/8, 6/8, 3/8, 0

There are thus 8 samples evenly distributed along one pitch Tx, as is the case for the scale electrodes, so that each electrode within one pitch, and by extension all electrodes, become momentarily receiving in turn; this is the case when numerator, here 5, and denominator, here 8, of the shifting increment expressed as a fraction of Tx, here 5/8, have no common divisor, or else the number of samples per pitch would be at least halved.

Taking f as a sampling frequency and demodulating the sample sequence by multiplying the samples sequentially by +1, −1, +1, −1, etc., a demodulated signal of frequency f/8 is obtained, due to the fact that couplings are spatially periodic, and approximate a sine wave of period Tx, so that a change in polarity is equivalent to a shift by Tx/2. The demodulated signal is then equivalent to the following sample sequence:

0, 1/8, 2/8, 3/8, 4/8, 5/8, 6/8, 7/8, 0, etc.

This sequence has effectively a frequency of f/8 after filtering to eliminate low frequency noise (rejected to high frequency by said demodulation) and high frequencies created by the sampling process (quantization noise).

If the shifting increment had been 3Tx/8, i.e. the other shift nearest to Tx/2, in the example given in FIG. 2, a demodulated signal of frequency f/8 would also be found, but the order of the sequence would be reversed, i.e. going to the left, against the direction of the shifts: 0, 7/8, 6/8, 5/8, etc. A shift near T/2 is thus advantageous as it becomes easy to reject low frequency noise signals. Furthermore, the signal on the momentarily receiving electrodes increases with the shifting increment as the amount of electrodes changing between potential V1 and V2 at each shift is proportional to said increment. But a limit is given by the minimum of one electrode remaining at the same potential on each side of one momentarily receiving electrode, i.e. N−M=3.

It is also possible to have sets of contiguous momentarily receiving electrodes, and/or shifting increments such that more than one electrode on each side of the momentarily receiving electrode, or electrodes, remain at the same potential. The advantage of having a pattern of isolated momentarily receiving electrodes, i.e. having one such electrode every half period (Tx) of the pattern lies in the simplicity of the commutation means. The disadvantage lies in smaller coupling capacitances to the scale, but this is partially offset by an equivalent reduction of the capacitance between momentarily receiving electrodes and substrate, so that resulting changes in potential are not much affected.

The number N of sensor electrodes over one pitch Tx may also vary from 4 upwards. With N=4, there is one electrode changing potential (M=1), one momentarily receiving electrode separated by two electrodes remaining at the same potential. The optimal choice for N will mainly be determined by the required linearity, filter performance and complexity of the electronics; a large N obviously requires more complex electronics but may only need a simple filter as the quantization noise frequency created by sampling will be much higher than the frequency of interest. In practice, N may also be limited by the manufacturing technology, e.g. if the sensor electrode substrate is a printed circuit. The example of a sensor according to the invention described herein and in FIGS. 2, 3, 4 has N=8 electrodes over one pitch Tx, for the sake of clarity of text and figures; if the sensor is implemented on a silicon substrate, as is the case in said example, it will be advantageous to have a higher number N, e.g. N=16 (with a shifting increment of M=9 electrodes and isolated momentary receiving electrodes, R=1, for example) or more; but N=16 is already sufficient, even with simple filtering means, for obtaining a good linearity, of the order of Tx/1000.

Figure 4:
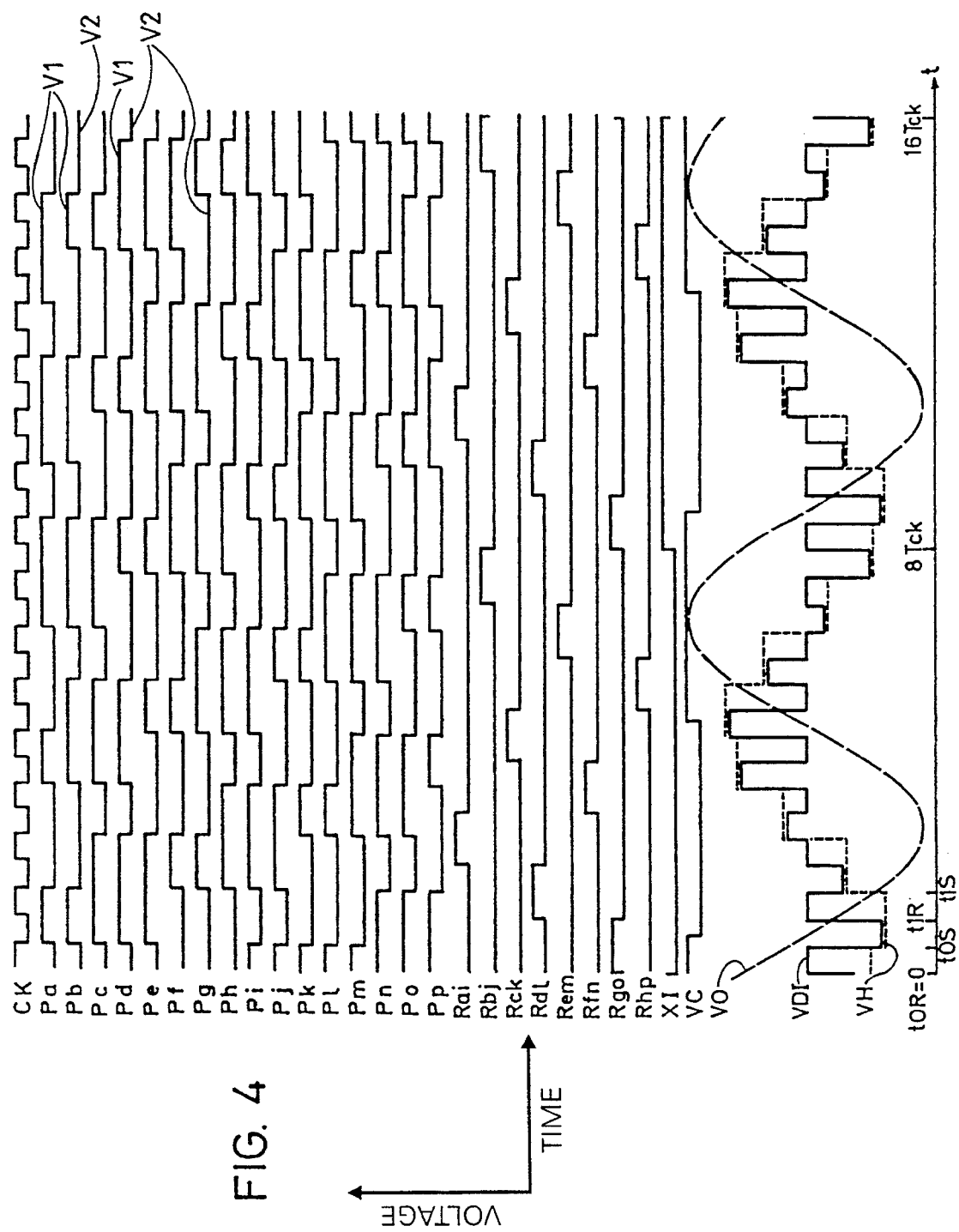
FIG. 4 shows the waveforms and signals of said electronic circuitry, corresponding to potential patterns and momentarily receiving electrode patterns partially shown in FIG. 2.

For generating the potential patterns and the momentarily receiving electrode patterns of a sensor according to the invention, shown by way of example in FIG. 2, and for extracting the relative position between scale and sensor from the signals coupled to said momentarily receiving electrodes, an electronic circuit whose essential parts are schematically shown in FIG. 3 may be used. The waveforms and signals generated by this circuit are shown in FIG. 4.

The signal generator 30, synchronized by an external clock signal CK, generates signals with a periodicity of 16 clock periods Tck on 16 lines Pa–Pp plus one line Xl, and also signals with a periodicity of 8 clock periods Tck on 8 lines Rai–Rhp.

The 16 lines Pa–Pp are respectively connected through switches S1a–S1p to corresponding electrodes 10a–10p, i.e. line Pa through switch Sa to electrode 10a, Pb through Sb to 10b, etc., so as to put the potential pattern (V1 or V2) on the electrodes. As shown on FIG. 4, the potential pattern on said lines is, at the time t0R set as origin (0T) of the time axis (t), the same as the potential pattern on the corresponding electrodes, shown in FIG. 2. This is also the case for times t0S, t1R, t1S. The signal generator 30 thus generates on these lines Pa–Pp the potential patterns for electrodes 10a–10p. As the signal pattern of FIG. 2 has a spatial period of 2Tx, corresponding to 16 electrodes, and as there is a shift of 5Tx/8, corresponding to 5 electrodes, at each period Tck off the clock signal CK, the potential pattern generated on lines Pa–Pp will be the same again every 16 clock periods. The signal generator logic necessary for generating said potential patterns on lines Pa–Pp is not shown in detail, but is easy to derive from the signals shown in FIG. 4, especially if remarking that the signals on lines Pa–Pp may be obtained by delaying the signal on line Pa by 1 to 15 clock periods. All what is needed is to generate the periodic sequence shown on line Pa, then obtain the 15 other signals, by means of a shift register being an integral part of the signal generator 30, in the following order.

Pf, Pk, Pp, Pe, Pj, Po, Pd, Pi, Pn, Pc, Ph, Pro, Pb, Pg, Pl, each signal being delayed by one clock period from the previous one. Note that adjacent lines in this sequence correspond to electrodes 5Tx/8, or 5 electrodes apart, precisely because of the potential pattern shifting increments of 5 electrodes.

The momentarily receiving electrode pattern is controlled by the 8 lines Rai–Rhp, each line controlling the selection of the electrodes designated by the line index, e.g. the line Rgo controls electrodes 10g and 10o. When such a line has the logic state "1", the corresponding electrodes are momentarily receiving. Here again, signals on lines Rai–Rhp shown in FIG. 4 correspond to the momentarily receiving electrode pattern shown in FIG. 2; e.g. in FIG. 4, line Rgo has the logic state "1" at times t0R and t0S while simultaneously electrodes 10g and 10o are shown as momentarily receiving on FIG. 2. The same electrodes being momentarily receiving again every 8 clock periods, signals on lines Rai–Rhp have thus a periodicity of 8 clock periods. The signals on lines Rai–Rhp, as shown in FIG. 4, acquire the logic state "1" in the following sequence:

Rgo, Rdl, Rai, Rnf, Rkc, Rhp, Rem, Rbj.

Here too, adjacent lines in this sequence control momentarily receiving electrode patterns 5Tx/8 apart. As the signal pattern on these lines change between potential pattern shifts on lines Pa–Pp, it is for example possible to generate the signals on lines Rai–Rhp from the above-mentioned shift register, by using the "master" flip-flop outputs to generate one pattern and the "slave" flip-flop outputs to generate the other. Some additional combinatorial and timing logic is also required. The design of the complete signal generator providing the signals shown in FIG. 4 is easy to implement by various logic circuits, thus not shown here.

As to the electrode switching and signal processing circuits, careful design is needed especially to avoid unwanted couplings between signals generated and momentarily receiving electrodes, so these circuits are schematically shown in FIG. 3. Each electrode 10a–10p is connected through an electronic switch S1a–S1p of same index to a line Pa–Pp of same index, e.g. electrode 10a through S1a to Pa. Each switch S1a–S1p is controlled by the line Rai–Rhp having a common index, e.g. S1a and S1i by Rai. The same line Rai–Rhp also controls three other electronic switches S2, S3, S4 of same index than S1; e.g. electrode 10a, connected to S1a, S2a, S3a, S4a controlled by line Rai. The three switches S2, S3, S4 connect, or not, electrodes of same index to one of two pickup lines I1 or I2. When the control signal on line Rai, for example, is in the logic state "0", it closes the switches S1 it controls, e.g. S1a, thus connecting electrode 10a to line Pa, i.e. to the potential pattern (V1 or V2). Switches S2a and S3a, also controlled by line Rai are opened by the logic state "0", thus disconnecting electrode 10a from pickup line I1, while switch S4a, equally controlled by said line, is closed by said logic level. Switch S4a connects the line between switches S2a and S3a to a constant potential, thus acting as a guard preventing any capacitive coupling from electrode to pickup line through both open switches S2, S3. When the control signal on a line Rgo, for example, is in logic state "1", it opens the switches S1 it controls, e.g. S1g, thus disconnecting electrode 10g from line Pg, i.e. from the potential pattern. A simple switch is sufficient here, as the potential on line Pg will not change as long as said switch S1g remains open. The logic state "1" on line Rgo also closes switches S2g, S3g and opens switch S4g, thus connecting electrode 10g to pickup line I2. Electrode 10g becomes a momentarily receiving electrode 10R, as well as electrode 10o, connected to switches S1o, S2o, S3o, S4o controlled by the same line Rgo. Note that the above, given as example, applies to all electrodes 10, switches S1 to S4 and lines R.

The signal received by the momentarily receiving electrodes is routed through the intermediary of pickup lines I1, I2, and electronic commutators S5, S6, to the inputs of two amplifiers 31, 32, sampled by switches S7, S8. Each amplifier 31, 32 is followed by a sample and hold circuit 33, 34 whose outputs are connected to a differential to single ended converter 35 followed by a filter 36 and a comparator 37. Because of the differential to single ended converter 35, and assuming that the gains of both amplifiers 31, 32 are equal, the whole circuit composed of said amplifiers and differential to single ended converter is equivalent to a differential amplifier, i.e. amplifying the difference (VDI) between the signals at its inputs. By swapping said signals on the amplifier inputs, one only changes the polarity of said signal difference VDI.

The sequence of electrode pairs becoming in turn momentarily receiving is as follows, starting at time 0 (t0R) in FIG. 3 and designated by their indexes: go, ld, ai, fn, kc, ph, em, jb, og, dl, ia, nf, ck, hp, me, bj.

If electrodes having the left index in the sequence mentioned above are connected to the input of amplifier 31, and the ones having the right index to the input of amplifier 32, the resulting signal sequence would be equivalent to following positions, expressed as above in fractions of Tx, . . . , 0, 5/8, 2/8, 7/8, 4/8, 1/8, 6/8, 3/8, 0, etc. By demodulating at frequency f/2, i.e. by multiplying the above sequence by the sequence +1, −1, +1, −1, etc. and filtering, a periodic waveform of frequency f/8, i.e. of period 8Tck. Said demodulation may take place after amplification, but is done here in front of the amplifiers; to this end the connections of every second electrode pair to pickup lines I1, I2 must be swapped, the momentarily receiving electrodes being thereafter connected to amplifier inputs 31, 32 in the sequence:

go, dl, ai, nf, kc, hp, era, bj, og, ld, ia, fn, ck, ph, me, jb, the electrode corresponding to the first index being connected to input 31, the one corresponding to the second being connected to input 32. By connecting switches S3a, S3b, S3d, S3e, S3g, S3h, S3k, S3n to pickup line I1, and switches S3c, S3f, S3i, S3j, S3l, S3m, S3o, S3p to I2, and connecting line I1 to amplifier input 31 and line I2 to amplifier input 32, the 8 first electrode pairs in the sequence above will be connected right, but the 8 last pairs will all be crossed, hence the presence of commutators S5, S6, controlled by line X1, and which cross the connections from pickup lines I1, I2 to amplifier 31, 32 inputs, thus reestablishing the correct connection sequence.

It is thus relatively easy to connect a pattern of isolated, i.e. non contiguous, momentarily receiving electrodes to amplifier 31, 32 inputs: two pickup lines I1, I2, with each electrode connectable to only one of them, and two commutators S5, S6, are enough.

The switches S7, S8, are controlled by the clock signal. After the shift of the pattern of momentarily receiving electrodes 10R, amplifiers 31, 32, which are inverting amplifiers, have their output shorted to their input, as switches S7, S8 are closed. Potentials will thus be practically the same, the amplifiers being identical, bringing the differential voltage VDI between amplifier 31, 32 inputs near zero. On the falling edge (logic "1" to logic "0" transition) of the clock signal, switches S7, S8 open and the coupled signals resulting from the subsequent potential pattern shift will be amplified and sampled and held by circuits 33, 34, before being converted from a differential to a single ended signal by circuit 35, whose output signal VH is shown in FIG. 4. A low-pass or band-pass filter 36 then enhances the demodulated waveform of frequency near f/8 by rejecting its harmonics and other noise, thus getting the signal VO shown in FIG. 4. This signal is then transformed in a logic signal VC by comparator 37. The phase shift of this signal VC relative to a reference signal obtained by dividing the clock frequency by 8, is an accurate measure of the displacement between scale 1 and sensor 2.

The reason of this accuracy being partly that, as most harmonics of the signal have been filtered out, the determination of its phase by its zero-crossing points, i.e. by the transitions of said logic signal VO at the output of the comparator 37, does not introduce significant errors. Another reason is that if advantageously both transitions (up and down) are taken to measure the phase, the influence of odd harmonics and d.c. offsets is opposed for both transitions (by advancing one and retarding the other) so their influence cancels out. The phase shift can thus be measured as the time average of two or more succeeding transitions, equivalent to the time of an imaginary transition exactly in the center of these succeeding transitions, and comparing it with the time of one of the transitions of said reference signal of frequency f/8: the time difference divided by the period of said reference signal, is the phase shift, expressed in "turns" (360 degrees of phase angle). Each "turn", i.e. here each period of 8 Tck of time difference corresponds to a spatial shift Tx between scale and sensor. Obviously, if the relative position between scale and cursor does not change, the phase, i.e. the time difference will remain the same. To get a finer position, the average of several measurements may be taken.

Measuring displacements over several spatial periods Tx between sensor and scale is straightforward, by keeping track of "turns", e.g. by adding, respectively subtracting a displacement Tx at each full "turn", i.e. at each transition of the phase angle from 360 to 0 degrees, respectively 0 to 360 degrees, before adding the displacement within one "turn" or 8Tx.

These phase angle transitions over 360 degrees, i.e. time differences over 8 Tck, may only be identified through continuous measurement, or in practice by measurements done at sufficiently close intervals, at best the interval separating two transitions of the signal VC, and adding or subtracting a displacement Tx each time the measured phase difference goes from 8 Tck to 0 or vice versa between two successive measurements. Determination of the relative position between scale and sensor within the interval Tx is thus absolute, and becomes incremental for larger intervals, i.e. the sensor must function permanently to keep track of the displacement. The phase measurement method described above is given by way of example, as other methods may also be used.

It may happen that a noisy signal engenders excessive phase jitter at the output of comparator 37. A classical solution in this case is to use a so-called phase locked loop, not shown here, in which the output of an internal oscillator is made to track, or lock on the average phase of the signal of interest, which may here be said comparator output, or also the output of the filter 36, or even the output of the differential to single ended converter 35.

As mentioned before, the description of the functions of a sensor according to the invention was done by examining the behavior of electrodes 10 being in the middle of a longer array, i.e. all being influenced similarly. This is of course the case for all electrodes of arrays "without ends" as in the rotary embodiment shown in FIG. 1B, but towards the ends of a linear array as in FIG. 1A, electrodes 10 are not influenced the same way and may falsify the measurement, especially in the case of misalignment between sensor and scale. An obvious remedy to that is to discard the signals from momentarily receiving electrodes near the ends of the array: in the case of a sensor according to the invention, this simply consists in never connecting electrodes near the ends to lines I1, I2, thus to the amplifier inputs. Care must be taken to ensure that all electrodes 10 which are still connectable to the amplifier inputs extend over an integer number of spatial periods 2Tx, so as to get a uniform momentarily receiving electrode distribution over one period T.

Such simple but effective measures may not be enough to eliminate the effects of misalignment between scale and sensor, particularly the variation in gap from one end to the other of the sensor array, which provokes a monotonous change in momentarily receiving electrode coupling capacitances as a function of their position in the array, the "center of gravity" of all momentarily receiving electrodes 10R moving within one spatial period Tx of the scale. The resulting error has thus a period Tx, as it is a function of the relative position of scale and sensor. Filtering this error may only eliminate its spatial harmonics; in order to remove the remaining error of spatial periodicity Tx a simple trick consists e.g. in having said still connectable electrodes extend over two areas, each extending over an integer number of periods 2Tx, separated by Tx/2, so that their error curves, similar but shifted by Tx/2 will tend to cancel each other.

A useful advantage lies in the possibility to tilt the sensor by a given angle while keeping the surface of its electrode array parallel to the surface of the scale while also tilting the scale electrodes (or relief features) the same way, so that electrodes of both arrays remain at least locally parallel. This makes it possible for a sensor with a given spatial period Tx to read scales having periods Tw larger than Tx. Apart from permitting measures in various scale factors with a given sensor pitch, this may be used to measure absolutely over larger periods while still keeping a high resolution by combining two or more differently tilted sensors with corresponding scales. Note that if Tw becomes much larger than Tx the tilt angle tends to 90 degrees.

Clearly, the invention is not limited by the embodiments described above, which may be suitably modified within the scope of claim 1.

A possibility consists in improving the performance of said second means, e.g. by using a high performance band-pass filter 36 to increase the sensitivity. The same goal may be achieved by reducing the sensor electrode to substrate capacitance in order to increase the voltage signal on the momentarily receiving electrodes; on a semiconductor substrate, this may be done by adding a polyimide layer under the electrodes. The capacitance reduction thus obtained has the added advantage of decreasing the capacitive current due to the electrodes commutating between V1 and V2.

The invention might be adapted to two dimensional measurement by providing a cursor with two orthogonal arrays of electrodes 10 facing a scale 2 provided with an array of electrodes 20 being spatially periodic along two orthogonal directions.

The scale 2 may also be provided with any kind of features 20 susceptible of influencing the sensor signals, such as a relief of raised or hollow dielectric or conducting features.

Finally, a sensor according to the invention is eminently suitable for integration in an electrostatic harmonic micromotor, i.e. having either a cylindrical rotor rolling inside an equally cylindrical stator of barely larger diameter or a flat disk shaped rotor whose periphery rolls on a flat stator (rotor and stator plane forming a very small angle). The rotating speed is a function of the angular celerity of the excitation field and of the difference in length between rotor and stator rolling paths (representing the succession of contact points or lines). Said difference is difficult to control, which makes it necessary to adjust the angular celerity of the excitation field in order to maintain a constant rotating speed (e.g. in a watch). This may be done by a sensor according to the invention, integrated on the stator, the scale being formed by a relief or an electrode array on the rotor.

Electric fields generated by the rotating potential pattern may even be used to power the motor. As described above, the angular position of the rotor, i.e. its speed, may be measured by the phase angle of the signal VC. A phase locked loop maintains a constant rotating speed by adjusting the clock frequency generating said rotating potential pattern used in the sensor as well as powering the motor.

The instrument according to the invention may also be integrated in other types of motors so as to control and/or adjust their rotating speed.

I claim:

1. A linear or angular measuring instrument comprising a capacitance sensor having a linear or curvilinear array of sensor electrodes, a scale facing said sensor and having an array of scale features, switching means for a) connecting first selected ones of the sensor electrodes to first means providing them with electrical signals so that they become part of a first spatially periodic pattern of momentarily transmitting electrodes and b) connecting second selected ones of the sensor electrodes to second means so that they become part of a second spatially periodic pattern of momentarily receiving electrodes, said second means determining a relative position of the sensor along the scale, wherein attribution of a sensor electrode to one of said first or second spatially periodic patterns is controlled by control means adapted to shift said first and said second spatially periodic patterns alternately by increments along said array of sensor electrodes so that the shifts of one spatially periodic pattern take place during the intervals between the shifts of the other spatially periodic pattern, the shifts of the first spatially periodic pattern being thus picked up by said second spatially periodic pattern of momentarily receiving electrodes, such that an electrode can be caused to become both transmitting and receiving during the course of a measurement said first and said second spatially periodic patterns being interleaved along said linear or curvilinear array of juxtaposed momentarily transmitting and receiving electrodes.

2. An instrument according to claim 1, wherein said first means provides a first spatially periodic pattern with a period 2Tx made of first groups of N electrodes connected to a first potential alternating with second groups of N electrodes connected to a second potential, N being an integer higher than 3, said second means providing a second spatially periodic pattern with a period Tx consisting of at least one electrode disconnected form each group of N electrodes to become momentarily receiving, the selected momentarily receiving electrodes being amidst at least two electrodes of same potential.

3. An instrument according to claim 2, characterized in that it comprises a signal generator (30) connected to 2N first lines (Pa–Pp), generating on one line (Pa) a periodic signal output derived from a clock input, and shifting said signal by 1 to 2N-1 clock periods to generate the additional 2N-1 signals for the 2N-1 remaining lines (Pb–Pp), each electrode being switchable to one of these lines.

4. An instrument according to claim 3, characterized in that said signal generator (30) is also connected to N second lines (Rai–Rhp) so as to provide said second pattern, the signals generated on said N second lines (Rai–Rhp) controlling electronic supply switches (S1) connecting or disconnecting each electrode with one of said first 2N lines (Pa–Pp), and electronic pickup switches (S2,S3) disconnecting, respectively connecting said electrode to an input of a differential amplifier.

5. An instrument according to claim 4, characterized in that each electrode 10 is connected to a first pickup switch (S2) followed by a second pickup switch (S3), the common part between said switches being connected to a constant potential when said switches are open.

6. An instrument according to claim 4, characterized in that the pickup switches (S2,S3) are connected to one of two third lines (I1,I2) which are connected by commutators (S5,S6) to amplifiers (31,32) followed by sample-and-holds (33,34) followed by a differential-to-single-ended converter (35), a filter (36) and a comparator (37).

7. An instrument according to claim 2, characterized in that said first and second pattern have shifting increments of M electrodes, M being an integer between 3 and N-3, N and M having no common divisor.

8. An instrument according to claim 7, characterized in that said first and second pattern have shifting increments of M electrodes, M being an integer close to N/2.

9. An instrument according to claim 2, characterized in that the momentarily receiving electrodes (10R) amidst electrodes connected to a first potential are connected to one input of a differential amplifier (35) and the momentarily receiving electrodes (10R) amidst electrodes connected to a second potential are connected to the other input of said differential amplifier.

10. An instrument according to claim 9, characterized in that the momentarily receiving electrodes (10R) near the ends of said first array are never connected to said switching means, the ones which may be connected extending over an integer number of periods 2Tx.

11. An instrument according to claim 2, characterized in that only a single electrode (10R) per group of N electrodes (10) is momentarily receiving at a time.

12. An instrument according to claim 2, characterized in that at least two contiguous electrodes (10R) per group of N electrodes (10) are momentarily receiving at a time.

13. An instrument according to claim 2, characterized in that the patterns formed by first and second groups of N electrodes before and after a shifting increment are symmetrical around the middle of any momentarily receiving electrode (10R), if isolated, or else around the middle of any group of contiguous momentarily receiving electrodes (10R).

14. An instrument according to claim 1, wherein said second means determines the relative position of said scale to the sensor by evaluating the phase of a demodulated signal received by the momentarily receiving electrodes.

15. An instrument according to claim 1, characterized in that it is adapted for two dimensional measurements by means of a sensor (1) having two orthogonal electrode arrays susceptible to cooperate with said organ (2) provided with an array being spatially periodic along two orthogonal directions.

16. An application of an instrument according to claim 1, characterized in that said instrument is integrated in a motor so as to control and/or adjust its rotating speed.

* * * * *